US010855643B2

(12) United States Patent
Zhang et al.

(10) Patent No.: US 10,855,643 B2
(45) Date of Patent: Dec. 1, 2020

(54) BLUETOOTH LOW ENERGY ADDRESS RESOLVING

(71) Applicant: TELEFONAKTIEBOLAGET LM ERICSSON (PUBL), Stockholm (SE)

(72) Inventors: Jingcheng Zhang, Norrköping (SE); Per Elmdahl, Linköping (SE); Thomas Rimhagen, Linköping (SE); Wei Shen, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 123 days.

(21) Appl. No.: 15/741,124

(22) PCT Filed: Jul. 2, 2015

(86) PCT No.: PCT/SE2015/050777
§ 371 (c)(1),
(2) Date: Dec. 29, 2017

(87) PCT Pub. No.: WO2017/003337
PCT Pub. Date: Jan. 5, 2017

(65) Prior Publication Data
US 2018/0198752 A1    Jul. 12, 2018

(51) Int. Cl.
*H04L 29/12* (2006.01)
*H04W 84/20* (2009.01)
(Continued)

(52) U.S. Cl.
CPC ........ *H04L 61/103* (2013.01); *H04L 61/2038* (2013.01); *H04L 61/2053* (2013.01);
(Continued)

(58) Field of Classification Search
CPC .............. H04L 61/103; H04L 61/2076; H04L 61/2053; H04L 61/2038; H04L 61/6022;
(Continued)

(56) References Cited

U.S. PATENT DOCUMENTS 9,417,769 B2 * 8/2016 Shirota ................. G06F 3/0483

9,756,461 B1 * 9/2017 Hu ........................ H04W 64/00
(Continued)

FOREIGN PATENT DOCUMENTS

EP    2400714 A1    12/2011
EP    2645665 A1    10/2013

OTHER PUBLICATIONS

International Search Report and Written Opinion issued in Application No. PCT/SE2015/050777 dated Feb. 29, 2016, 10 pages.
(Continued)

*Primary Examiner* — Michael Won
(74) *Attorney, Agent, or Firm* — Rothwell, Figg, Ernst & Manbeck, P.C.

(57) ABSTRACT

The present disclosure relates to methods and arrangements in a private address resolving node of a personal area network deploying Bluetooth low energy, BLE and in particular to methods and arrangements for proactively resolving periodically updated private addresses. When performed in a private address resolving node of a personal area network deploying Bluetooth low energy, BLE, a method comprises resolving a periodically updated private address of a private address generating node connected to the private address resolving node. The private address is used in addressing messages from the private address resolving node to the private address generating nodes. The method comprises receiving (S41), from a private address generating node in the personal area network, an Identity Resolving Key, IRK, the IRK being received over an encrypted link established between the private address resolving node and the private address generating node and receiving (S43), from the private address generating node, private address update information defining when and how to update the private address of the private address generating node. Based on the received IRK and the received private address update information, an updated private address to be used when addressing a next message to the private address generating node is determined (S45).

27 Claims, 6 Drawing Sheets

(51) Int. Cl.
  *H04W 12/02* (2009.01)
  *H04W 12/00* (2009.01)
  *H04L 29/06* (2006.01)
  *H04W 4/80* (2018.01)

(52) U.S. Cl.
  CPC ....... *H04L 61/2076* (2013.01); *H04W 12/001* (2019.01); *H04W 12/02* (2013.01); *H04W 84/20* (2013.01); *H04L 61/6022* (2013.01); *H04L 63/0414* (2013.01); *H04L 63/0428* (2013.01); *H04W 4/80* (2018.02)

(58) Field of Classification Search
  CPC ........... H04L 63/0414; H04L 63/0428; H04W 12/02; H04W 84/20; H04W 4/80
  See application file for complete search history.

(56) References Cited

U.S. PATENT DOCUMENTS

| 2012/0042098 A1* | 2/2012 | Kasslin | H04L 9/3236 709/245 |
| 2014/0105396 A1* | 4/2014 | Engelien-Lopes | H04W 12/04 380/270 |
| 2017/0013450 A1* | 1/2017 | Ziv | H04W 12/06 |
| 2018/0172664 A1* | 6/2018 | Love | H04W 4/38 |
| 2018/0198752 A1* | 7/2018 | Zhang | H04L 61/103 |
| 2018/0317071 A1* | 11/2018 | Rabii | H04W 4/80 |
| 2019/0108324 A1* | 4/2019 | Graube | H04L 9/3231 |

OTHER PUBLICATIONS

European Office Action issued in Application No. 15897285.1 dated May 28, 2018, 6 pages.

Sifalakis M. et al., "Network address hopping a mechanism to enhance data protection for packet communications", Communications, 2005. ICC 2005. 2005 IEEE International Conference on Seoul, Korea, May 16-20, 2005, Piscataway, NJ, USA, IEEE, vol. 3, pp. 1518-1523, XP010825538.

Anonymous, "Bluetooth Specification Part B: Link Layer Specification Core System Package [Low Energy Controller volume]", Dec. 2, 2014, pp. 25-119, XP055473941, retrieved from the Internet: URL:https://www.bluetooth.org/DocMan/handlers/DownloadDoc.ashx?doc_id=286439&_ga=1.114916295.1519320728.1470653509.

* cited by examiner

BLUETOOTH LOW ENERGY ADDRESS RESOLVING

CROSS REFERENCE TO RELATED APPLICATION(S)

This application is a 35 U.S.C. § 371 National Stage of International Patent Application No. PCT/SE2015/050777, filed Jul. 2, 2015, designating the United States, the disclosure of which is incorporated by reference.

TECHNICAL FIELD

The present disclosure relates to methods and arrangements in a private address resolving node of a personal area network deploying Bluetooth low energy, BLE and in particular to methods and arrangements for proactively resolving periodically updated private addresses.

BACKGROUND

Bluetooth low energy, BLE, is a wireless personal area network technology designed by the Bluetooth Special Interest Group, SIG. Compared to Classic Bluetooth, BLE is intended to provide considerably reduced power consumption and cost while maintaining a similar communication range. The amount of data being transmitted by BLE devices is presumably much less than data transmitted by Classic Bluetooth devices.

In BLE, a master device/central node is arranged to communicate with a slave device/peripheral node, e.g. to control the slave device/peripheral node and/or to receive data from it, or to send data to it. In the following disclosure, the terminology of central node and peripheral nodes or devices will be used. However, it should be appreciated that this terminology also denotes an arrangement with a master node and one or more slave nodes. The peripheral node is typically an addressable radio device, having an associated device address and configured to respond to radio messages addressed to the device address.

In BLE, a device address is included in some of the message frames, e.g. at the beginning of the data exchange the device address is included in a message called advertisement or advertising message. The advertising function of BLE is widely utilized. Many BLE enabled beacon devices (e.g., iBeacon, uBeacon) utilize BLE advertisement to periodically broadcast vendor specific information. Beacons are small, often inexpensive devices that transmit small amounts of data via BLE over short ranges, up to 50 meters. Moreover, all BLE peripheral devices need to send advertisements in order to establish connections with BLE central devices. Due to massive usage, privacy issues of advertisement utilization needs to be addressed. There is a possibility for a person to be identified and/or tracked by listening for a device address or addresses known to be associated with that person. However, eavesdroppers should not be able to track a BLE device by monitoring the address field of the advertisement from a specific advertiser. In order to solve this problem in the BLE specification, e.g. BLE specification 4.0, published 30 Jun. 2010, a resolvable private address may be used instead of a static, public address, i.e., a periodically updated private resolvable address can be used in the advertiser address field of the advertisement message to replace the public Bluetooth address which never changes.

FIG. 1 discloses the structure of a resolvable private address. The address consists of a randomly generated 24-bit random number, prand, concatenated with a 24-bit hash part. The hash part is generated with a hash function that takes a random generated number and a shared address resolving key, named Identity Resolving Key, IRK, as inputs. The IRK value is exchanged between central node and the peripheral node within an encrypted BLE connection. When a resolvable address is received, the receiver can resolve the address by using the IRK and the random number part, aka, prand part of the received private address to match the hash part of the address in order to find the correct address.

During standard IRK exchange procedure between a central node and peripheral nodes, an encrypted link is first established between the devices. If a device does not have an IRK, it uses the predefined hash function to generate one. The locally generated IRK is sent to the peer device so that it can be used for future address resolving.

A private address resolving procedure is defined in the specification. IRK keys received from peripheral nodes are saved in a table in the central node. Typically, for a central node, the table is used to save keys that are sent from peripheral devices that would like to be recognized while using private resolvable address. For example, the resolvable address can be included in the advertisement so that the central node can receive the advertisement and resolve the address. In such a case, peripheral node can be reconnected by the central node while keeping the privacy as well. However, it could also be possible that a similar table is maintained by a peripheral node which has previously been connected with many central nodes. In this case, a peripheral node can identify a central device when the central device wants to establish a connection by sending a connect request which includes its private resolvable address.

In both cases, once a resolvable address is received, the receiving device needs to fetch every stored IRK in the table and the prand part of the received address as inputs to calculate the hash result. During this process, if any calculated result matches the hash part of the received address, the address is considered resolved. Otherwise, the address is considered not resolvable.

A node changes its private address at regular intervals by generating a new value of prand and calculating a corresponding new hash value. With the exception of the two most-significant bits, the private address appears as random data also following change of address. However, the private address can still be resolved using the Identity Resolving Key shared with the central node. On receiving a resolvable private address, the central node tries to decrypt the hash component using the IRK of each peripheral node known to it. If a particular IRK results in a decrypted value that matches the prand component of the address, this reveals the identity of the respective peripheral node because the address must belong to the peripheral node whose IRK was successfully used. When a peripheral device advertises itself using a resolvable private address, an eavesdropper will not be able to identity or track the slave device for any longer than the interval between address changes. Similarly, if a central node uses a resolvable private address when scanning for or connecting with a peripheral node, an eavesdropper will be unable to identify or track the eavesdropper for longer than the interval between the address changes.

A major problem of existing solutions is that the private address resolving mechanism defined in the specification consumes a lot of resources, especially while the private address is changed at regular intervals. Thus, the existing address resolving process is not efficient.

The private address generation and resolving mechanism use Advanced Encryption Standard, AES, for encryption and decryption. Most of the time, one central node contains many IRK values belonging to different previously connected peripheral devices. For each received resolvable private address, the central node has to do the above described address resolving process. In a place where peripheral devices are densely deployed, the central node could consume many resources for resolving every received private address. The performance could get even worse if both the central node and peripheral node hold a long IRK list and try to connect with each other.

SUMMARY OF THE INVENTION

It is an object of the present disclosure to provide methods and arrangements for a proactive address resolving mechanism, which seek to mitigate, alleviate, or eliminate one or more of the above-identified deficiencies in the art and disadvantages singly or in any combination.

This object is achieved by a method, performed in a private address resolving node of a personal area network deploying Bluetooth low energy, BLE, of resolving periodically updated private addresses of private address generating nodes connected to the private address resolving node. The private addresses are used in addressing messages from the private address resolving node to the private address generating nodes. The method comprises the step of receiving from a private address generating node in the personal area network, an Identity Resolving Key, IRK. The IRK is being received over an encrypted link established between the private address resolving node and the private address generating node. The method also comprises receiving private address update information from the private address generating node, the private address update information defining when and how to update the private address of the private address generating node. Based on the received IRK and the received private address update information, an updated private address to be used when addressing a next message to the private address generating node is determined.

With the introduction of the private address update information, a private address resolving device can pre-calculate the address of a private address generating node and use this pre-calculated value whenever a change is effected of the private address. The effect of this is a method to resolve a private address that requires much less computational power and resources on resolving one private address compared with the solution defined in the specification. This is because the expected "address" is pre-calculated.

According to an aspect of the disclosure, the private address resolving node is a central node in the personal area network and the private address generating node is a peripheral node, or vice versa, i.e., wherein the private address generating node is a central node in the personal area network and the private address resolving node is a peripheral node.

According to another aspect of the disclosure, the private address update information comprises an Address Update Interval, AUI, that indicates an updating periodicity for when to update a private address.

The use of an Address Update Interval provides the advantage of an updating periodicity at least corresponding to an updating frequency for generating the regularly updated private addresses.

According to another aspect of the disclosure, the private address update information comprises a Prand Update Rule, PUR, indicating how to generate an updated private address by defining a rule for updating a prand field in the resolvable private address.

Thus, a rule based updating procedure is enabled, that allows pre-calculating of an address of a private address generating node.

According to another aspect of the disclosure, the method comprises a step of storing the updated private address in a link layer white list comprising addresses of trusted private address generating nodes for which a quick connect procedure is allowed.

Consequently, aspects of the present disclosure allow pre-calculating and saving addresses into the white list for each node. The white list of each node contains the addresses that are considered to represent an address of a trusted device. The method calculates the desired address proactively and save the address into the white list. This enable a much faster connection by skipping the IRK resolving iteration process.

A further benefit of the disclosed method is that this method is also useful in a BLE mesh network so that a private address could also be identified and resolved more efficiently in a BLE mesh network.

According to another aspect of the disclosure, the generated updated private address is stored in addition to a previously stored private address of the private address generating node in the white list. The previously stored private address is deleted from the white list following a predetermined time period.

The object of the present disclosure is also achieved by a private address resolving node configured to resolve periodically updated private addresses of private address generating nodes connected to the private address resolving node in a personal area network deploying Bluetooth low energy, BLE. The private address resolving node comprises processing circuitry configured to receive, from a private address generating node in the personal area network, an Identity Resolving Key, IRK, the IRK being received over an encrypted link established between the private address resolving node and the private address generating node. The processing circuitry is further configured to receive, from the private address generating node, private address update information defining when and how to update the private address of the private address generating node; and to determine, based on the received IRK and the received private address update information, an updated private address to be used when addressing a next message to the private address generating node.

According to another aspect of the disclosure, the private address resolving node comprises a receiver module configured to receive, over an encrypted link established between the private address resolving node and a private address generating node, an Identity Resolving Key, IRK, and private address update information defining when and how to update the private address of the private address generating node. A private address determination module of the private address resolving node is configured to determine an updated private address to be used when addressing a next message to the private address generating node based on received IRK and the private address update information.

The object of the present disclosure is also achieved in a computer readable storage medium, having stored thereon a computer program which, when run in a private address resolving node of a personal area network, causes the private address resolving node to perform the above disclosed method.

The object of the present disclosure is also achieved by a method, performed in a private address generating node, of generating a periodically updated private address to be used for addressing messages from a private address resolvable node to the private address generating node in a personal area network deploying Bluetooth low energy, BLE. The method comprises the steps of sending to a receiving private address resolving node, an Identity Resolving Key, IRK, the IRK being sent over an encrypted link established between the private address generating node and the private address resolving node and sending to the receiving private address resolving node, private address update information defining when and how to update the private address of the private address generating node. An updated private address of the private address generating node is generated using the private address update information.

Thus, the present disclosure provides the advantage of a proactive address calculation in a private address resolving node by introducing predictability for the updated private address without compromising the integrity protection of this updated private address. The effect of this is a method to resolve a private address that requires much less computational power and resources on resolving one private address compared with the solution defined in the specification.

The object of the disclosure is also achieved by a private address generating node configured to generate a periodically updated private addresses to be used for addressing messages from a private address resolving node to the private address generating node in a personal area network deploying Bluetooth low energy, BLE. The private address generating node comprises processing circuitry configured to send, to a receiving private address resolving node, an Identity Resolving Key, IRK, the IRK being sent over an encrypted established between the private address generating node and the private address resolving node and send, to the receiving private address resolving node, private address update information defining when and how to update the private address of the private address generating node. The processing circuitry is further configured to generate an updated private address of the private address generating node using the private address update information.

According to an aspect of the disclosure, the private address generating node comprises a sender module configured to send, over an encrypted link established between the private address generating node and a private address resolving node, an Identity Resolving Key, IRK, and private address update information defining when and how to update the private address of the private address generating node. An address generating module of the private address generating node is configured to generate an updated private address using the private address update information.

The object of the present disclosure is further achieved in a computer readable storage medium, having stored thereon a computer program which, when run in a private address generating node of a personal area network, causes the private address generating node to perform the above disclosed method disclosed.

Said node arrangements and said computer readable storage media each display advantages corresponding to advantages described for the corresponding methods and aspects of the methods.

DETAILED DESCRIPTION

Figure 1:
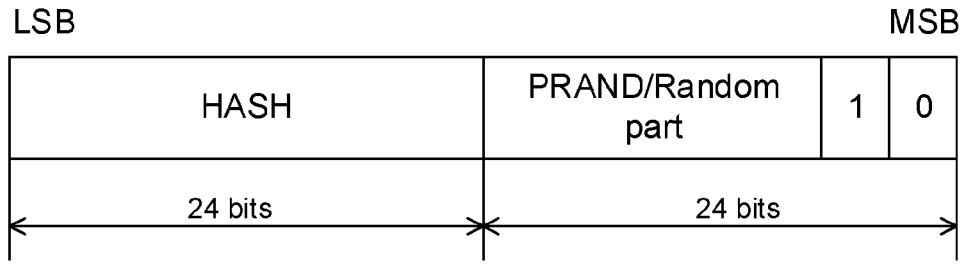
FIG. 1 illustrates a resolvable private address format.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For the illustration of operations of a method embodiment, it should be appreciated that the operations need not necessarily be performed in disclosed order if not stated otherwise in this disclosure. Furthermore, it should be appreciated that not all of the operations need to be performed. The example operations may be performed in any suitable order and in any combination of the illustrated embodiments in the figures.

FIG. 1 illustrates a resolvable private address format. The address is separated into three parts, as illustrated. The first two most significant bits (MSBs) must be set to 0 and 1 accordingly so that the address can be identified as a resolvable private address. The private resolvable address, illustrated in FIG. 1, is generated by using a predefined hash function. Such function takes a random generated number and a shared address resolving key, named Identity Resolving Key, IRK, as inputs. The IRK value is exchanged between peer nodes within an encrypted BLE connection. When a resolvable address is received, the receiving node can resolve the address by using the IRK and the random number part, aka, prand part of the received private address to match the hash part of the address in order to find the correct address. The resolvable private address is recognizable from the address format.

Figure 2:
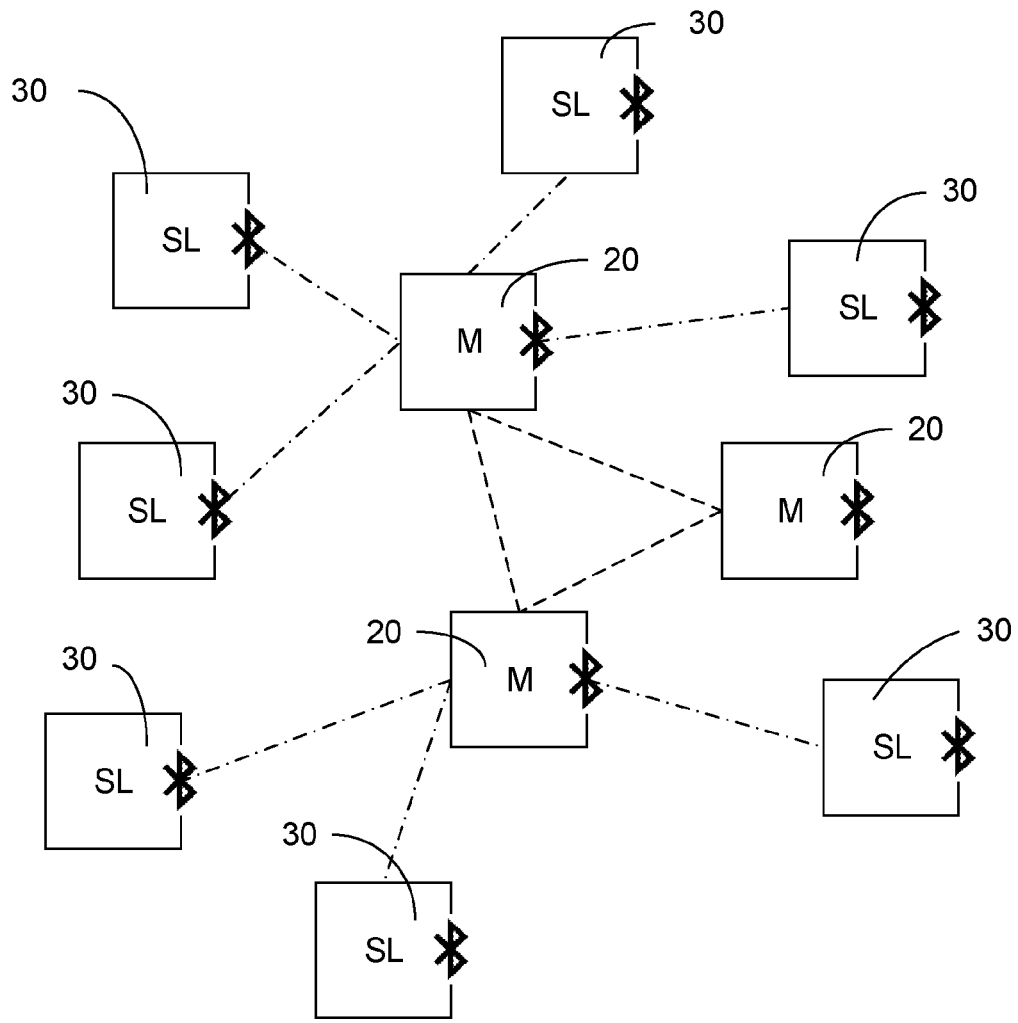
FIG. 2 illustrates a personal area network deploying BLE.

FIG. 2 illustrates a personal area network 10 deploying Bluetooth low energy, BLE. A master device 20, in the following also known as central node, communicates with one or more slave devices 30, in the following presentation also known as a peripheral node, over respective wireless communication links. In the disclosed scenario, a master device 20 could be a mobile phone, while the slave devices 30 are any other type of entities connected to the master device in a personal area network, e.g. a a heart rate monitor, a proximity tag or any other type of low power devices. A plurality of wireless Bluetooth links may be established between the master device and respective connected slave devices. In BLE an advertising function is widely utilized when setting up the connection. Many BLE enabled beacon devices (e.g., iBeacon, uBeacon) utilize BLE advertisement to periodically broadcast vendor specific information. As previously explained, beacons are small, often inexpensive devices that transmit small amounts of data via BLE over short ranges, up to 50 meters. Moreover, all BLE slave devices need to send advertisement in order to establish connections with BLE master devices. Due to massive usage, privacy issues of advertisement utilization needs to be addressed. Eavesdroppers should not be able to track a BLE device by monitoring the address field of the advertisement from a specific advertiser. In order to solve this problem, as defined in the BLE specification, a periodically updated private resolvable address can be used in the advertiser address filed of the advertisement message to replace the public Bluetooth address which never changes.

Figure 3:
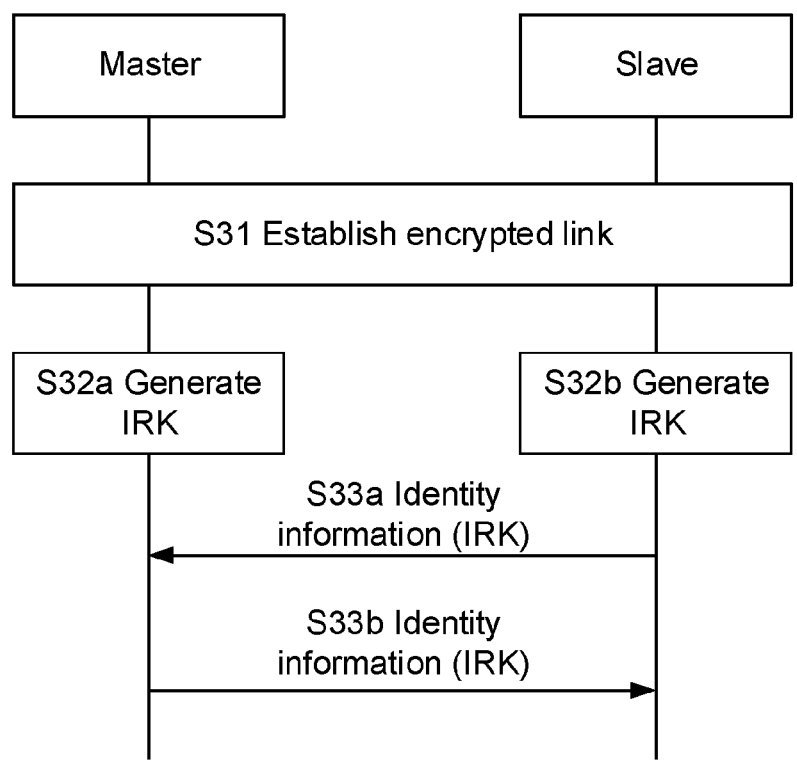
FIG. 3 illustrates a prior art exchange procedure for an Identity Resolving Key, IRK.

FIG. 3 illustrates the prior art IRK exchange procedure between peer devices, here illustrated as a master device 20 and a slave device 30, e.g. of the personal area network illustrated in FIG. 2. In the context of BLE, a master device or central devices is adapted to scan for other devices and initiate an outgoing connection request to and advertising peripheral device. A master device could for example be a smartphone/tablet/PC. The slave device or peripheral device on the other hand advertise and then waits for a connection, i.e. accepts an incoming connection request in response to the advertising. An important distinction between the master and slave device in a BLE network is that a slave is connected to a single master device, while a master device may be connected to multiple slaves, e.g. as illustrated in FIG. 2. In a mesh network, several master devices may be interconnected.

Firstly, an encrypted link is established S31 between the devices of the connection. An Identity Resolving Key is generated S32a in the master device. If a slave device does not have an IRK, it uses the predefined hash function to generate S32b an IRK. Finally, the IRK:s generated in the respective devices S33a, S33b are exchanged such that they can be used for future address resolving.

A major problem with the prior art solution for resolving private addresses is that the private address resolving mechanism defined in the specification consumes a lot of resources and is not efficient. Most of the time, one master device contains many IRK values which belong to different previously connected slave devices. For each received resolvable private address, the master has to perform an address resolving process. In a place where slave devices are densely deployed, a lot of resources would be devoted in the master device to resolve every received private address. The performance could get even worse if both the master and slave device holds a long IRK list and try to connect with each other.

Furthermore, the white list defined in the BLE link layer is not used when resolving the private address. The white list of each device contains the addresses that are considered as "addresses of trusted devices". Such a list is designed for a fast BLE connection with filtering function. However, the white list cannot be used during private address resolving process. This is because the master device cannot predict the next expected private address by using the method defined in the specification.

Also, the current solution defined in the specification cannot enable the private address identification in a BLE mesh network. Since the IRK value is only stored in the peer device during the encrypted connection, it is impossible for other devices in the mesh network resolve the private address since the IRK value for the specific device is missing. For example, if the device moves within the BLE mesh network, once it is outside the radio range of the peer device, such device cannot be recognized by using the address filed since the rest of the mesh node does not have the specific IRK information for that device.

Accordingly, it is an object of the present disclosure to provide a proactive, private address resolving mechanism for BLE enabling pre-calculation of the private address by introducing a private address resolving node. Furthermore, it is an object of the present disclosure to enable a resolving mechanism whereby the private address can be resolved and identified by using the white list.

By using received information from a private address generating node, a private address resolving device can pre-calculate the address and save the address into the white list.

Figure 4:
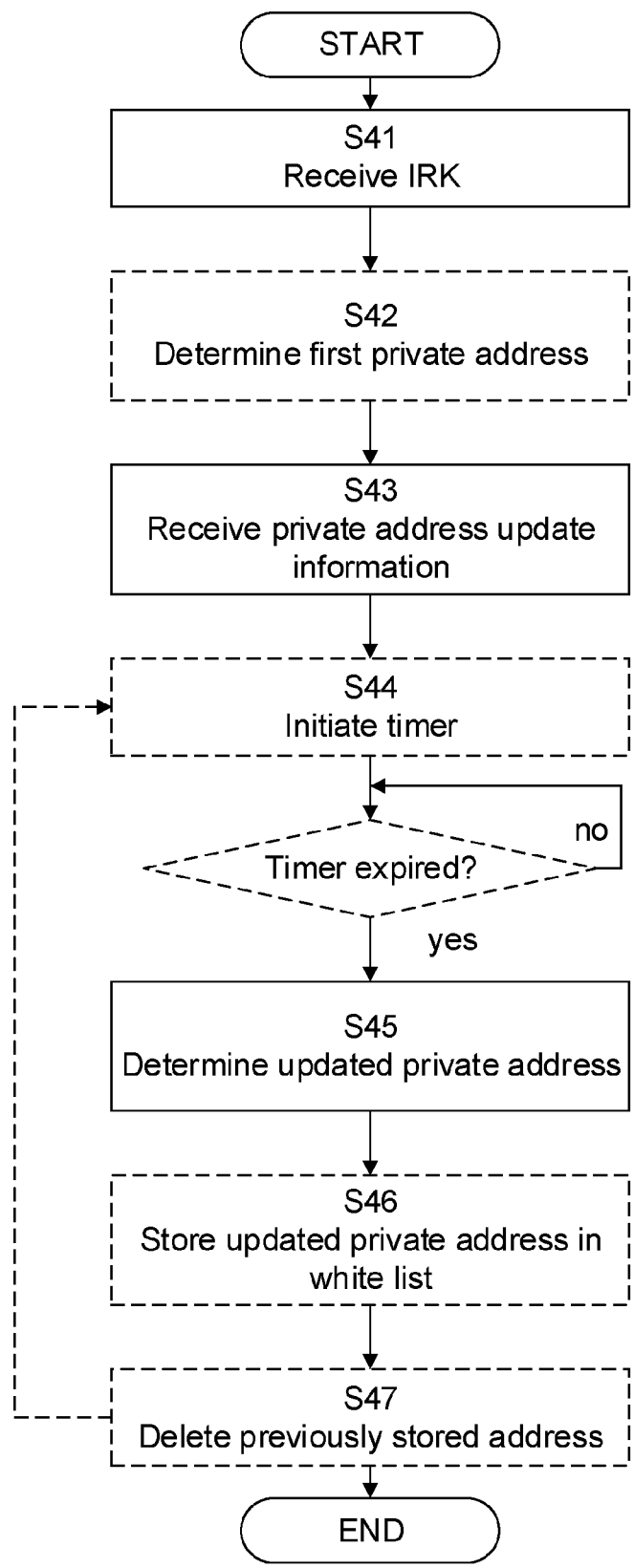
FIG. 4 illustrates method steps performed in a private address resolving node.

A method for proactively resolving a periodically updated private address will now be discussed with reference to the flowchart of FIG. 4, illustrating example operations performed in a private address resolving node, e.g. as disclosed in FIG. 5 or 6. According to the present disclosure, the private address resolving node is a node of a wireless personal area network deploying Bluetooth Low Energy, BLE. The private addresses are used in addressing messages from the private address resolving node to the private address generating nodes when a connection has been established between the nodes.

In one context, the disclosed method of resolving a periodically updated private address comprises receiving S41, from a private address generating node in the personal area network, an Identity Resolving Key, IRK, the IRK being received over an encrypted link established between the private address resolving node and the private address generating node. In the context of a master slave set up as previously disclosed, this step corresponds to the slave device sending an advertisement and the waiting for a connection. The IRK:s of the private address generating node and of the private address resolving node are used to generate the resolvable private address of the slave device to be used when pairing a slave device with a master device. The method also comprises receiving S43, from the private address generating node, private address update information defining when and how to update the private address of the private address generating node. Returning to the previous master and slave discussion, this step corresponds to the slave device providing information on how information in the advertisement is updated. Thus, the slave device provides information to a receiving master device of a need to update the private address when addressing the private address generating node in an attempt to set up a connection. The update information may be included in the advertisement from the slave device. An updated private address to be used when addressing a next message to the private address generating node is determined S45 based on the received IRK and the received private address update information. In other words, the receiving master device uses the received information to update the private address when addressing the slave device, while still maintaining the integrity of the private address.

According to an aspect of the disclosure, the private address resolving node is a central node in the personal area network, e.g. a master device for the connection. In such instances, the private address generating node is a peripheral node in the personal area network, e.g. a slave device in the connection. However, the reversed situation is also within the scope of the present situation, where a private address is generated in a central node and resolved by a receiving peripheral node.

Stated differently, according to an aspect, the private address resolving node is a central node in the personal area network and wherein the private address generating node is a peripheral node, or wherein the private address generating node is a central node in the personal area network and the private address resolving node is a peripheral node.

When a resolvable private address is received, the receiver can resolve the private address by using the IRK and the random number part, aka, prand part of the received private address to match the hash part of the address in order to find the correct address, i.e. including a step of determining S42 a resolvable first private address based on the received IRK.

According to an aspect, the private address update information comprises an Address Update Interval, AUI, that indicates an updating periodicity for when to update a private address. Thus, the Address Update Interval, AUI, message may contain an interval indicative of how often the private address should update, for example, every 15 minute. A timer is initiated in the private address resolving node with the interval defined in the AUI message at the same time as a timer is initiated in the private address generating node with the same interval. The timer interval represents the time period between updating of the private address of the private address generating node. Thus, upon expiry of the timer, an updated private address is required for the connection between the master device and the slave device. The private address resolving node uses the private address update information to pre-calculate the updated private address upon expiry of the timer.

According to an aspect of the present disclosure, the AUI information is synchronized when a private address resolving node and a private address generating node are connected so that the effect of clock drifting is avoided in the two communicating nodes. Furthermore, every time that the two devices are re-connected, re-synchronization of the clock or AUI information may be performed to correct for the clock drifting.

According to an aspect, the private address update information comprises a Prand Update Rule, PUR, indicating how to generate an updated private address by defining a rule for updating a prand field in the resolvable private address. Thus, the Prand Update Rule, PUR, message contains the rule of how the prand should be calculated every time when a private address needs to be updated. For example, a simple pseudo number generation rule could be defined. However, other rules could also be defined, for example, a specific hash function or more or less complicated rules. The purpose for this message is to ensure that a same number can be generated on both sides of the connection so that the private address resolving node always maintains up to date information on the private address of a connected device, i.e. a private address generating node. The generated number value is one of the inputs of the hash function which generates the hash part of the private address.

According to an aspect, the method further includes a step of initiating S44 a timer based on the AUI. As long as the AUI and PUR messages are received, a timer is created with the interval defined in the AUI message.

According to an aspect, the method further includes a step of storing S46 the updated private address in a link layer white list comprising addresses of trusted private address generating nodes for which a quick connect procedure is allowed. When the timer expires, the device generates a new private address using the given PUR and the corresponding IRK. The generated private address is then saved into the white list. Since there might be clock drifting between the peer devices, the previously calculated address should be removed with a certain delay when a new address is calculated. By using the disclosed procedure, an updated private address is recalculated and stored in the white list so that once a first advertisement message with a private address is received, this can be recognized directly and saved in the white list of the device.

According to an aspect, the generated updated private address is stored S46 in addition to a previously stored private address of the private address generating node in the white list, and wherein the previously stored private address is deleted S47 from the white list following a predetermined time period.

According to an aspect, the method further includes a step of re-initiating S44 the timer based on the AUI when an updated private address is determined, and repeating the step of determining an updated private address based on the PUR. The AUI timer is restarted to maintain the next address update interval.

Keeping the exact same clock in two distributed devices could be difficult. The major reason is that inaccuracy of the device clock constantly introduces clock drifting. In this case, the clock or the AUI information should be re-synchronized when two devices are connected in order to correct the clock drifting.

According to an aspect, the method further includes retrieving the updated private address of the white list and using the updated private address when addressing the private address generating node. For example, the updated private address is retrieved from the white list and is used either in an advertisement packet (slave device) or in a connection request packet (master device).

By using the AUI and the PUR, the desired private address can be pre-calculated by the address resolving node, and saved into the white list. As a result, the private address can be resolved and identified by using the white list directly. No more calculation is needed when resolving a private address.

By using this procedure, a private resolvable address can be pre-calculated in the receiver side. For example, once an advertisement message with private address is received, it can be recognized directly since it is already saved in the device white list.

Moreover, the proposed method does not exclude the private address resolving method defined in the specification. If a resolvable address cannot be found in the white list, the method defined in the specification can be utilized immediately afterwards for the same address.

Figure 5:
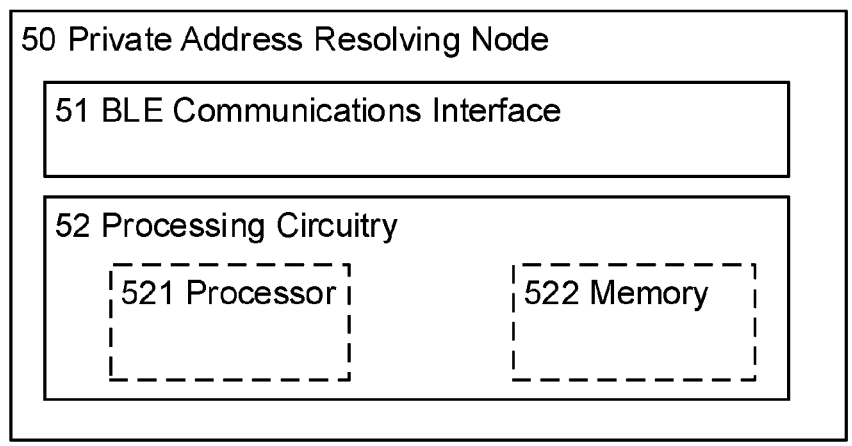
FIG. 5 illustrates a private address resolving node embodiment.
Figure 6:
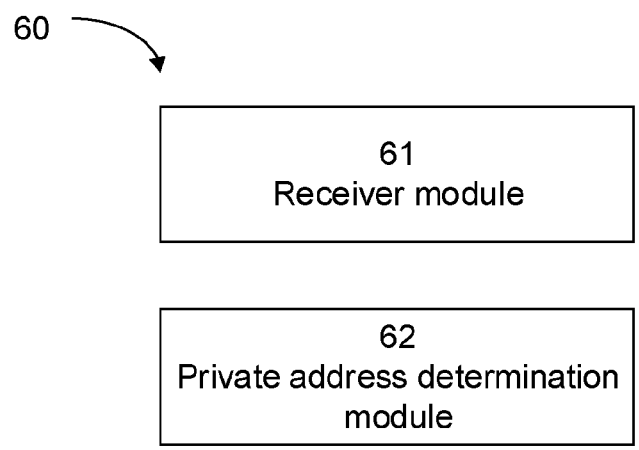
FIG. 6 illustrates a private address resolving node embodiment.

FIGS. 5 and 6 illustrate arrangements for a private address resolving node configured to perform the above disclosed method for resolving a periodically updated private address.

FIG. 5 illustrates a private address resolving node 50, e.g. a master device, configured to resolve periodically updated private addresses of private address generating nodes connected to the private address resolving node in a personal area network deploying Bluetooth low energy, BLE. The private address resolving node comprises processing circuitry 51 configured to receive, from a private address generating node in the personal area network, an Identity Resolving Key, IRK, the IRK being received over an encrypted link established between the private address resolving node and the private address generating node. The processing circuitry is further configured to receive, from the private address generating node, private address update information defining when and how to update the private address of the private address generating node and determine, based on the received IRK and the received private address update information, an updated private address to be used when addressing a next message to the private address generating node. The private address resolving node also comprises a BLE communications interface 52 enabling wireless communication with a private address generating node as disclosed in FIG. 8, e.g. a slave device.

According to an aspect, the processing circuitry comprises a processor 511 and a memory 512 containing instructions executable by said processor.

According to some aspects, the disclosure relates to a computer readable storage medium, having stored thereon a computer program which, when run in a private address resolving node of a personal area network, causes the private address resolving node to perform the method disclosed in FIG. 4.

FIG. 6 illustrates a private address resolving node 60 configured to resolve periodically updated private addresses of private address generating nodes connected to the private address resolving node in a personal area network deploying Bluetooth low energy, BLE. The private address resolving node comprises a receiver module 61 configured to receive, over an encrypted link established between the private address resolving node and a private address generating node, an Identity Resolving Key, IRK, and private address update information defining when and how to update the private address of the private address generating node. The private address resolving node also comprises a private address determination module 62 configured to determine an updated private address to be used when addressing a next message to the private address generating node based on received IRK and the private address update information.

Turning back to FIG. 2 disclosing the personal area network, it will be appreciated that method operations are also performed in the private address generating nodes to enable the proactive resolving of the present disclosure.

Figure 7:
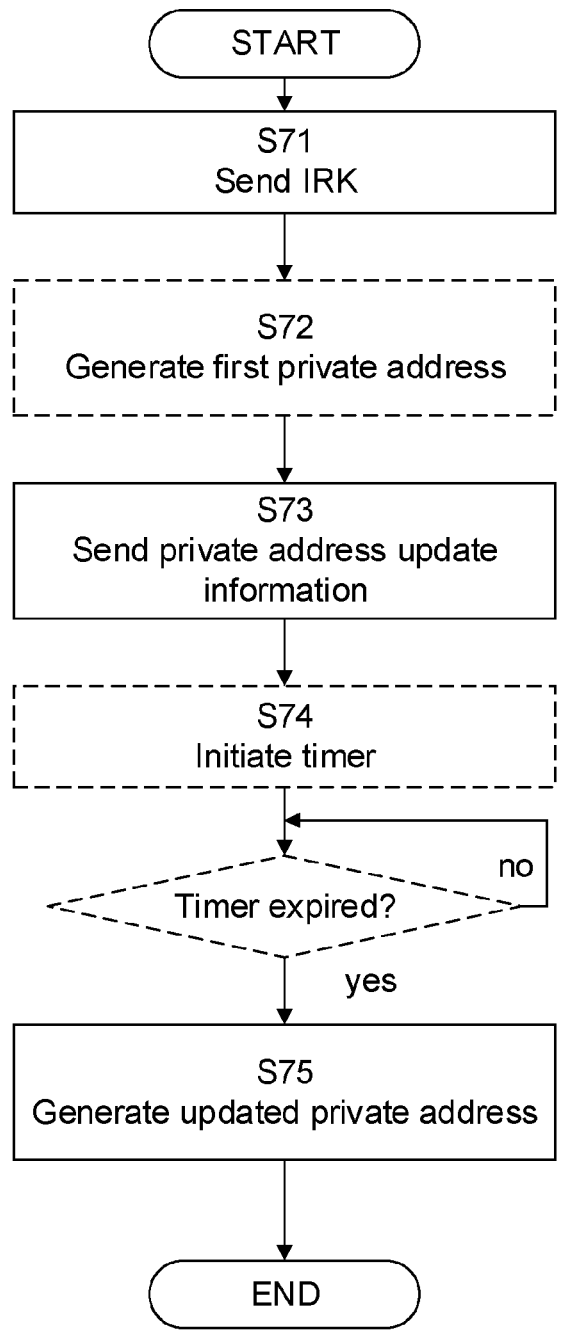
FIG. 7 illustrates method steps performed in a private address generating node.

A method for proactively generating a periodically updated private address will now be discussed with reference to the flowchart of FIG. 7, illustrating example operations performed in a private address generating node, e.g. as disclosed in FIG. 8 or 9. According to the present disclosure, the private address resolving node is a node of a wireless personal area network deploying Bluetooth Low Energy, BLE. The private addresses are used in addressing messages from the private address resolving node to the private address generating nodes when a connection has been established between the nodes.

FIG. 7 illustrates a method, performed in a private address generating node, of generating a periodically updated private address to be used for addressing messages from a private address resolvable node to the private address generating node in a personal area network deploying Bluetooth low energy, BLE. The method comprises the steps of sending S71, to a receiving private address resolving node, an Identity Resolving Key, IRK, the IRK being sent over an encrypted link established between the private address generating node and the private address resolving node. As previously mentioned, the IRK:s of the private address generating node and of the private address resolving node are used to generate the resolvable private address of the slave device to be used when pairing a slave device with a master device. The method further comprises sending S73, to the receiving private address resolving node, private address update information defining when and how to update the private address of the private address generating node. The method also comprises generating S75, an updated private address of the private address generating node using the private address update information, i.e. generating the private address complying with the information defining when and how to update the private address.

According to an aspect of the disclosure, the private address generating node is a central node in the personal area network, e.g. a master device for the connection. In such instances, the private address resolving node is a peripheral node in the personal area network, e.g. a slave device in the connection. However, the reversed situation is also within the scope of the present situation, where a private address is resolved in a receiving central node and generated by a peripheral node.

Stated differently, according to an aspect, the private address generating node is a peripheral node of a personal area network and wherein the private address generating node is a central node, or wherein the private address generating node is a peripheral node of a personal area network and wherein the private address resolving node is a central node.

According to an aspect, the method further includes a step of generating S72 a resolvable first private address based on the IRK. The resolvable first private address can be resolved by using the IRK and the random number part, aka, prand part of the first private address to match the hash part of the first private address in order to find the correct address.

According to an aspect, the private address update information comprises an Address Update Interval, AUI, that indicates an updating periodicity for when to update a private address. The Address Update Interval, AUI, message contains the interval that indicates how often the private address should update, for example, every 15 minute. The updated private address is used in the advertisement packet from the private address generating node.

According to an aspect, the private address update information comprises a Prand Update Rule, PUR, indicating how to generate an updated private address by defining a rule for updating a prand field in the resolvable private address. The Prand Update Rule, PUR, determines how the prand should be calculated every time when a private address needs to be updated. According to an aspect, a simple pseudo number generation rule is defined by the PUR. According to another aspect, a specific hash function is defined by the PUR. The purpose for this message is to ensure that a same number can be generated in both master and slave side. The generated number value is one of the inputs of the hash function which generates the hash part of the private address.

According to an aspect, the method further includes a step of initiating, S74, a timer based on the AUI. Once the AUI and PUR information is sent to the private address resolving node, the private address generating node starts a timer according to the sent AUI interval. According to an aspect, the private address generating node waits for an acknowledgement message from the private address resolving node before starting the timer. Once the timer expired, it uses the sent PUR and IRK information to generate the private address, which according to some aspects can be used either in an advertisement packet of a slave device or in a connection request packet of a master device.

According to an aspect, the method further includes a step of re-initiating S74 the timer based on the AUI when an updated private address is generated, and repeating the step of generating an updated private address based on the PUR. By re-initiating S74 the timer, the private address generating node keeps updating the private address.

According to an aspect of the disclosure, the generated updated private address replaces a previously stored private address. According to another aspect, the generated updated private address is stored in addition to a previously stored private address of the private address generating node, and wherein the previously stored private address is deleted following a predetermined time period.

Figure 8:
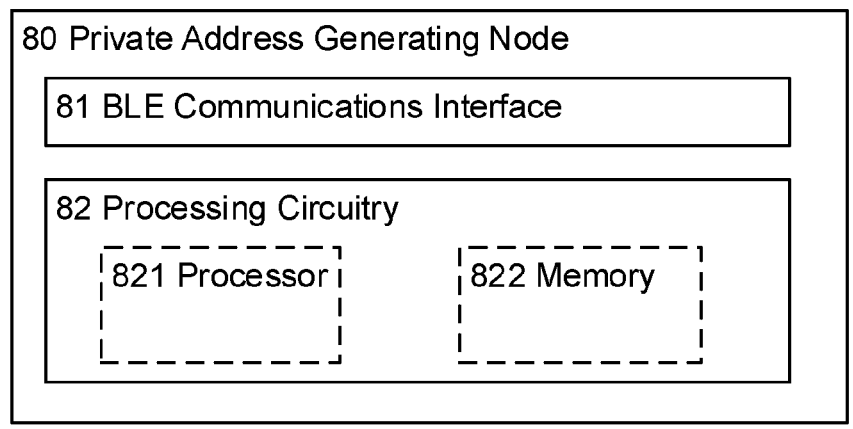
FIG. 8 illustrates a private address generating node embodiment.
Figure 9:
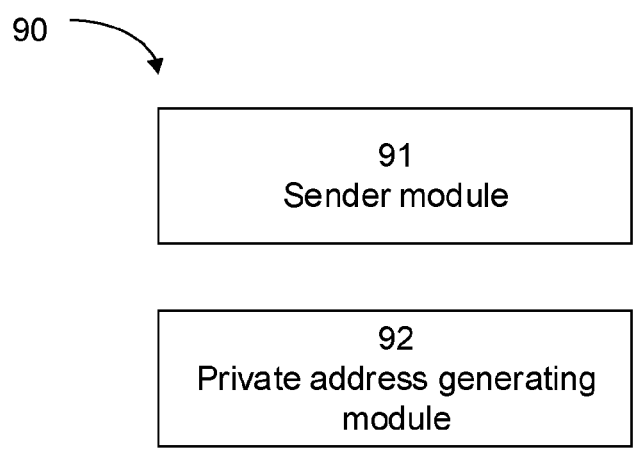
FIG. 9 illustrates a private address generating node embodiment.

FIGS. 8 and 9 illustrate arrangements for a private address generating node.

FIG. 8 illustrates a private address generating node 80, e.g. a slave device, configured to generate a periodically updated private address to be used for addressing messages from a private address resolving node to the private address generating node in a personal area network deploying Bluetooth low energy, BLE. The private address generating node comprises processing circuitry 81 configured to send, to a receiving private address resolving node, an Identity Resolving Key, IRK, the IRK being sent over an encrypted established between the private address generating node and the private address resolving node. The processing circuitry is further configured to send, to the receiving private address resolving node, private address update information defining when and how to update the private address of the private address generating node and generate an updated private address of the private address generating node using the private address update information. The private address generating node also comprises a BLE communications interface 82 enabling wireless communication with a private address resolving node as disclosed in FIG. 5, e.g. a master device.

According to an aspect, the processing circuitry comprises a processor 811 and a memory 812 containing instructions executable by said processor.

According to some aspects, the disclosure relates to a computer readable storage medium, having stored thereon a computer program which, when run in a private address generating node of a personal area network, causes the private address resolving node to perform the method disclosed in FIG. 7.

FIG. 9 illustrates a private address generating node 90 configured to generate periodically updated private addresses of private address resolving nodes connected to the private address generating node in a personal area network deploying Bluetooth low energy, BLE. The private address generating node comprises a sender module 91 configured to send, over an encrypted link established between the private address generating node and a private address resolving node, an Identity Resolving Key, IRK, and private address update information defining when and how to update the private address of the private address resolving node and an address generating module 92 configured to generate an updated private address using the private address update information.

The above disclosure has been provided for a procedure between peer devices. However, the same procedure is extendable also to BLE mesh networks so that a device in the mesh network may be identified and addressed within the mesh network. According to an embodiment, the AUI and PUR information can be distributed together with IRK information to other mesh nodes in a BLE mesh network so that every BLE mesh node is enabled to identify and resolve a private address of a device that uses the private address in an advertisement. By using the proactive private address calculation method proposed in this disclosure, the private address of a node can be pre-calculated and identified by other mesh nodes actively within the mesh network.

The disclosed method also works together with the standard private address resolving mechanism. By using this method, a much faster BLE connection can be created by using the pre-calculated private address. If this mechanism failed, the private address can still be resolved by using the standard address resolving process as backup.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Within the context of this disclosure, the terms "wireless terminal" or "wireless device" encompass any device which is able to communicate wirelessly with another device, as well as, optionally, with an access node of a wireless network by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc.

The various example embodiments described herein are described in the general context of method steps or processes, which may be implemented according to some aspects by a computer program, comprising computer readable code which, when run on an node in a contention based communication system, causes the node to perform the method according to above. The computer program, embodied in a computer-readable medium, includes computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a private address resolving node of a personal area network deploying Bluetooth low energy (BLE) of resolving a periodically updated private address of a private address generating node connected to the private address resolving node, wherein the private address is used in addressing messages from the private address resolving node to the private address generating nodes, the method comprising the steps of:
   receiving, from a private address generating node in the personal area network, an Identity Resolving Key (IRK), the IRK being received over an encrypted link established between the private address resolving node and the private address generating node;
   receiving, from the private address generating node, private address update information that includes (i) timing information defining at least a time interval that indicates how often the private address resolving node should update a private address of the private address generating node and (ii) further information defining how to update the private address;
   detecting that the time interval has elapsed;
   determining based on the received IRK and the received private address update information, a new private address to be used when addressing a next message to the private address generating node; and
   after detecting that the time interval has elapsed, updating the private address of the private address generating node, wherein updating the private address comprises setting the private address to the new private address.

2. The method of claim 1, wherein the private address resolving node is a central node in the personal area network and wherein the one private address generating node is a peripheral node, or wherein the private address generating node is a central node in the personal area network and the private address resolving node is a peripheral node.

3. The method of claim 1, further including steps of:
   receiving an address message sent from the private address generating node, wherein the address message includes a random number part and a hash part;
   calculating a value using the random number part and the IRK;
   comparing the calculated value with a value of the hash part;
   after determining that the calculated value matches the value of the hash part, using a private address associated with the address message to send a message to the private address generating node; and
   after determining the updated private address, using the updated private address to send a message to the private address generating node.

4. The method of claim 1, wherein the private address update information comprises an Address Update Interval (AUI) that indicates an updating periodicity for when to update a private address.

5. The method of claim 1, wherein the private address update information comprises a Prand Update Rule (PUR) indicating how to generate an updated private address by defining a rule for updating a prand field in the resolvable private address.

6. The method of claim 4, further including the step of initiating a timer based on the AUI.

7. The method of claim 6, further including the step of re-initiating the timer based on the AUI when an updated private address is determined, and repeating the step of determining an updated private address based on the PUR.

8. The method of claim 2, further including the step of storing the updated private address in a link layer whitelist that comprises addresses of trusted private address generating nodes for which a quick connect procedure is allowed.

9. The method of claim 1, wherein the generated updated private address is stored in addition to a previously stored private address of the private address generating node in the whitelist, and wherein the previously stored private address is deleted from the whitelist following a predetermined time period.

10. The method of claim 8, further including retrieving the updated private address of the whitelist and using the updated private address when addressing the private address generating node.

11. A private address resolving node configured to resolve a periodically updated private address of a private address generating node connected to the private address resolving node in a personal area network deploying Bluetooth low energy (BLE), the private address resolving node comprising:
   a BLE communications interface; and
   processing circuitry configured to:
      receive, from a private address generating node in the personal area network, an Identity Resolving Key (IRK), the IRK being received over an encrypted link established between the private address resolving node and the private address generating node;
      receive, from the private address generating node, private address update information that includes (i) timing information defining at least a time interval that indicates how often the private address resolving node should update a private address of the private address generating node and (ii) further information defining how to update the private address;
      detect that the time interval has elapsed;
      determine, based on the received IRK and the received private address update information, a new private address to be used when addressing a next message to the private address generating node; and
      after detecting that the time interval has elapsed, update the private address of the private address generating node, wherein updating the private address comprises setting the private address to the new private address.

12. The private address resolving node of claim 11, wherein the processing circuitry comprises a processor and a memory containing instructions executable by said processor.

13. A private address resolving node configured to resolve a periodically updated private address of a private address generating node connected to the private address resolving node in a personal area network deploying Bluetooth low energy (BLE), the private address resolving node comprising:
   a receiver configured to receive, over an encrypted link established between the private address resolving node and a private address generating node, an Identity Resolving Key (IRK) and private address update information that includes (i) timing information defining at least a time interval that indicates how often the private address resolving node should update a private address of the private address generating node and (ii) further information defining how to update the private address; and
   a processing unit comprising one or more processors, the processing unit being configured to:
      detect that the time interval has elapsed;

determine a new private address to be used when addressing a next message to the private address generating node based on received IRK and the private address update information; and after detecting that the time interval has elapsed, update the private address of the private address generating node, wherein updating the private address comprises setting the private address to the new private address.

14. A non-transitory computer readable storage medium, having stored thereon a computer program which, when run in a private address resolving node of a personal area network, causes the private address resolving node to perform the method of claim 1.

15. A method, performed in a private address generating node, of generating a periodically updated private address to be used for addressing messages from a private address resolvable node to the private address generating node in a personal area network deploying Bluetooth low energy (BLE), the method comprising the steps of:

sending, to a receiving private address resolving node, an Identity Resolving Key (IRK), the IRK being sent over an encrypted link established between the private address generating node and the private address resolving node;

sending, to the receiving private address resolving node, private address update information that includes (i) timing information defining at least a time interval that indicates how often the private address resolving node should update a private address of the private address generating node and (ii) further information defining how to update the private address;

detecting that the time interval has elapsed; and after detecting that the time interval has elapsed, generating, an updated private address of the private address generating node using the private address update information.

16. The method of claim 15, wherein the private address generating node is a peripheral node of a personal area network and wherein the private address generating node is a central node, or wherein the private address generating node is a peripheral node of a personal area network and wherein the private address resolving node is a central node.

17. The method of claim 15, further including the steps of:

updating the private address of the private address generating node (i) at the particular time (ii) in a way defined in said further information; and receiving from the private address resolving node a message addressed to the updated private address.

18. The method of claim 15, wherein the private address update information comprises an Address Update Interval, AUI, that indicates an updating periodicity for when to update a private address.

19. The method of claim 15, wherein the private address update information comprises a Prand Update Rule (PUR) indicating how to generate an updated private address by defining a rule for updating a prand field in the resolvable private address.

20. The method of claim 18, further including the step of initiating a timer based on the AUI.

21. The method of claim 20, further including the step of re-initiating the timer based on the AUI when an updated private address is generated, and repeating the step of determining an updated private address based on the PUR.

22. The method of claim 15, wherein the generated updated private address replaces a previously stored private address.

23. The method of claim 15, wherein the generated updated private address is stored in addition to a previously stored private address of the private address generating node, and wherein the previously stored private address is deleted following a predetermined time period.

24. A private address generating node configured to generate a periodically updated private addresses to be used for addressing messages from a private address resolving node to the private address generating node in a personal area network deploying Bluetooth low energy (BLE), the private address generating node comprising:

a BLE communications interface; and processing circuitry configured to:

send, to a receiving private address resolving node, an Identity Resolving Key (IRK), the IRK being sent over an encrypted established between the private address generating node and the private address resolving node;

send, to the receiving private address resolving node, private address update information that includes (i) timing information defining at least a time interval that indicates how often the private address resolving node should update a private address of the private address generating node and (ii) further information defining how to update the private address;

detect that the time interval has elapsed; and after detecting that the time interval has elapsed, generate an updated private address of the private address generating node using the private address update information.

25. The private address resolving node of claim 24, wherein the processing circuitry comprises a processor and a memory containing instructions executable by said processor.

26. A private address generating node configured to generate a periodically updated private address, to be used for addressing messages from a private address resolving node to the private address generating node in a personal area network deploying Bluetooth low energy (BLE), the private address generating node comprising:

a sender module configured to send, over an encrypted link established between the private address generating node and a private address resolving node, an Identity Resolving Key (IRK), and private address update information that includes (i) timing information defining at least a time interval that indicates how often the private address resolving node should update a private address of the private address generating node and (ii) further information defining how to update the private address; and a private address generating module configured to:

detect that the time interval has elapsed;

after detecting that the time interval has elapsed, generate an updated private address using the private address update information.

27. A non-transitory computer readable storage medium, having stored thereon a computer program which, when run in a private address generating node of a personal area network, causes the private address resolving node to perform the method disclosed in claim 15.

* * * * *